United States Patent Office 3,350,175
Patented Oct. 31, 1967

3,350,175
COLORIMETRIC INDICATOR DEVICE FOR THE DETERMINATION OF GASES
Paul Willis McConnaughey and Shirley Gross Clay, Pittsburgh, Pa., assignors to Mine Safety Appliances Company, Pittsburgh, Pa., a corporation of Pennsylvania
No Drawing. Filed July 2, 1963, Ser. No. 292,461
13 Claims. (Cl. 23—254)

This invention relates to the colorimetric determination of gases, and more particularly to such determination wherein a stream of gas to be tested is passed through an elongate bed of colorimetric indicator.

Heretofore, a variety of gases have been qualitatively or quantitatively determined by passing a predetermined amount of gas through an indicator tube consisting of an elongate bed of colorimetric indicator contained in a transparent tube. The indicator is responsive to the quantity of detectable gas contacted with the indicator, and, hence, by using a gas sample of predetermined volume is responsive to the concentration of detectable gas in the sample.

Two types of indicator tubes have been widely used. One type, exemplified by Littlefield, U.S. Patent 2,174,349, utilizes a dry colorimetric indicator consisting of an active color-changing reagent on a porous, absorbent carrier, such as silica gel or alumina gel. As the gas sample is passed through the indicator tube a color change or stain develops at the inlet and progresses along the bed, the length of stain being dependent on the amount of detectable gas passed into the tube. This type of apparatus, commonly designated as a length of stain apparatus, has been very popular, especially for field use by unskilled or semi-skilled personnel, because of its extreme simplicity of operation. There are, however, certain undesirable characteristics of such indicator tubes that are inherent in the use of absorbent carriers, for the carrier absorbs detectable gas from the gas sample irrespective of the condition of the active colorimetric chemical disposed on it. As the stain progresses along the length of the tube more detectable gas is absorbed by the bed upstream of the color change front and hence less detectable gas reaches this front so the amount of color change or stain development decreases for a given concentration of detectable gas. As is readily apparent, this results in a decrease in sensitivity and accuracy as the stain progresses along the indicator tube. For example, a typical carbon monoxide indicator of this type that has a sensitivity of 10 parts per million in the range of 10 to 40 p.p.m., has a sensitivity of only 100 p.p.m. in the range of 400 to 1000 p.p.m. This characteristic is compensated for in use by comparing the length of stain against a precalibrated non-linear scale; frequently, the variation in sensitivity is such that scales pre-calibrated in units of concentration are substantially logarithmic. There is an increased likelihood of read-out error with non-linear scales, and because of the varying sensitivity throughout the tube length, zero scale points must be precisely located in relation to the indicator bed.

A second type of colorimetric indicator utilizes a liquid color-changing chemical reagent which is distributed over non-porous carriers, such as glass beads. The indicating liquid is contained in an ampoule that is broken to release the liquid over the carrier immediately prior to use. Such apparatus are color comparison devices in which the depth or shade of color varies with varying amounts of gas to be detected. Inasmuch as color comparison is more prone to subjective error than the observation of the length of a stain, as the need to provide an ampoule and ampoule breaking means adds to the expense of the apparatus, and as the procedure of breaking an ampoule is somewhat inconvenient, detectors of this type have been generally used only for gases for which no satisfactory length of stain indicator is available.

It is an object of this invention to provide an indicator tube that has a substantially linear response to varying amounts of detectable gas. Another object is to provide an indicator that does not absorb any significant amount of detectable gas after it has changed color in response to contact with the detectable gas. Another object is to provide a free-flowing color-changing indicator consisting of a color-changing material dispersed on a non-porous carrier. Another object is to provide an indicator tube that has substantially a constant sensitivity and accuracy throughout its usable range. Other objects will be apparent from the following description.

The present invention comprises a novel indicator for detecting gases in which a finely divided non-porous carrier is coated with a color-changing material including an active colorimetric reagent and a binder. This novel indicator provides a large surface area for exposure to a gas sample but yet has no significant capacity to absorb or adsorb the detectable gas in the sample after a color-changing reaction has occurred. Novel indicator tubes comprising an elongate bed of our indicator in a transparent tube exhibit a substantially linear response to varying amounts of detectable gas throughout their length, and have substantially constant sensitivity throughout their length.

Any finely divided, inorganic, non-porous carrier is suitable for use in our indicator, such as, for example, glass beads, powdered glass, glazed ceramic chips, glazed ceramic beads or metal shot. The particle size of the carrier is sufficiently small to permit it to be poured to form a bed that appears to the unaided eye to be a continuous material, that is, the individual particles are not readily discernible to the unaided eye at a normal reading distance. The particle size should be sufficiently large to permit gas flow through a bed of the particles without undue resistance to flow. Suitably, the particle size of carriers is between about 40 and 100 mesh and preferably between about 60–80 mesh. It is preferred to use carriers of spherical shape and substantially uniform size, such as glass beads, since they provide beds of readily determinable and reproducible surface area and flow resistance.

Suitable binders include any powdered, inorganic absorbent that adheres to the carrier, such as clay, acid treated clays, diatomaceous earth, bentonite, bauxite, fuller's earth or the like. In order to form an adherent film on the carrier, the binder must be of a substantially finer particle size than the carrier, generally it is preferred to use binders that pass a 200 mesh screen or are even more finely divided. A great variety of such binders are commercially available, for example, Florigel or Min–U–Gel–200, products of the Floridan Company. Also, absorbent binders that are not normally adherent can be used when impregnated with a colorimetric reagent containing a viscous non-volatile liquid; for example, pulverized silica gel will not adhere strongly to glass beads, but silica gel impregnated with concentrated sulfuric acid will adhere and is suitable for use in indicators of this invention.

Any active colorimetric reagent may be incorporated in our indicators provided the binder and carrier do not adversely affect or react with the reagent or detectable gas. The term "colorimetric reagents" as used herein includes: single chemicals that are reactive with the detectable gas with a change of color, such as, for example, lead acetate for determining $H_2S$; combinations of a chemical reactive with the gas and a colorimetric reagent that changes color in response to the reaction products, such as oxalic acid with a pH indicator for determining ammonia; and combinations of a colorimetric chemical and a special absorbent for the detectable gas, such as palladium sulfite salts with silica gel for determining carbon monoxide. The amount of colorimetric reagent may be adjusted as desired to provide the desired reactive capacity with varying amounts of detectable gas.

The inorganic carriers and binders are substantially inert and do not affect the colorimetric reaction of the various known organic and inorganic colorimetric reagents, except for acid-base indicators since the various carriers and binders may have an acidic, basic, or neutral character. The binder and carrier may be selected to be neutral or to provide the acidic or basic character desired when using indicators containing acid-base colorimetric reagents. For example, indicator with acid-base colorimetric reagents for determining acid should be basic, and this basicity may be provided by using a soft glass bead carrier that has a basic character. Also, the acidity or basicity of the binder or carrier may be changed or compensated for by the incorporation of a suitable amount of non-volatile base or acid in the colorimetric reagent.

The indicators of this invention are prepared by intimately mixing the desired amount of carrier, binder, colorimetric reagent and a volatile liquid solvent or dispersing medium and then evaporating the volatile liquid from the mixture to form a dry, free-flowing, finely divided indicator. The ingredients are preferably thoroughly premixed and the mixing action is continued throughout the period during which the solvent is evaporated. As will be apparent to those skilled in the art, such mixing and drying may be accomplished in a variety of ways, but a most convenient method is to mix and dry in a rotary drier that tumbles the mixture. Drying temperatures should be low enough to avoid decomposition of the reagent. Water, lower alcohols, lower ethers and the like are generally used as solvents or dispersing liquids, and any non-reactive liquid may be used that is sufficiently volatile to permit removal of the liquid at drying conditions that do not adversely affect the colorimetric reagent.

The amount of binder used should not exceed that amount which will adhere to the carrier. Indicators containing too much binder have distinctly visible areas of coloration more intense than the main body of the indicator, so that any required adjustment of carrier and binder proportions can be made based on mere visual inspection. Excess binder can be sifted from an indicator by mild vibration. The amount of binder that will adhere to the carrier will vary depending on the particular binder and carrier used, and substantially more than the ordinary amount of binder can be used when the colorimetric reagent includes a viscous, non-volatile liquid, such as sulfuric acid. An indicator exhibiting a uniform color can be obtained using substantially less than the aforementioned maximum amount of binder, and generally it is preferred to use from about 10 to 50% of the maximum amount of binder, which amount can be evenly dispersed with much less mixing. Illustrative of typical proportions, a maximum of about 0.85 gram of binder will adhere to 100 grams of 60–80 mesh glass beads, with between about 0.08 and 0.40 gram being preferred.

The following examples are illustrative of the indicator of this invention, their preparations and their use.

*Example I.*—Seven hundred fifty grams of clean 60–80 mesh glass beads and 0.6 gram of the absorbent clay Florigel were mixed together in a glass bottle to evenly disperse the mixture. A solution of 0.080 gram of Congo Red indicator dissolved in 40 ml. of distilled water was added with continuing agitation. While continuing the agitation, the mixture was vaccum dried at 50° C. until the indicator was dry and free flowing. The indicator produced was of a uniform red color, reflecting the basicity of the soft glass carrier.

Sufficient portions of the indicator were poured into a 3.0 mm. I.D. glass tube to form a bed 70 mm. long, which was held in place between organdy cloth plugs inserted into the tubes. The tubes were tested for quantitative determination of HCl vapor in a conventional portable tester apparatus that accepts the tube and is provided with a hand pump that forces 100 cc. of gas sample through the tube for each stroke of the pump. The substantially linear response to various amounts of HCl passed into the tube is illustrated by the following results:

TABLE I

[200 p.p.m. HCl in air]

| Sample Volume, cc. | Stain Length, mm. |
|---|---|
| 50 | 11 |
| 100 | 22 |
| 200 | 44 |
| 300 | 66 |

TABLE II

[Sample volume, 500 cc.]

| Concentration, p.p.m. HCl | Stain Length, mm. |
|---|---|
| 5 | 5.5 |
| 10 | 9 |
| 15 | 12.5 |
| 20 | 16 |
| 25 | 19.5 |
| 30 | 23 |
| 40 | 29.5 |
| 50 | 36 |
| 75 | 51 |

*Example II.*—Fifteen hundred grams of clean 60–80 mesh glass beads, 3.50 grams of the absorbent clay Florigel, 30 ml. of 1 Normal oxalic acid in alcohol and 0.030 gram of thymol blue in 30 ml. of methanol were charged to a glass bottle and thoroughly agitated by shaking. The mixture was vacuum dried as in Example I, producing a uniform lavendar indicator. Indicator tubes (3 mm. I.D.) containing this indicator, prepared as in Example I, showed a substantially linear length of stain development in response to varying amounts of ammonia contained in NH₃-air mixtures passed through the tube. For example, a continuous flow of sample gas through the tube for one minute at a flow rate of 100 cc./min. developed a 42 mm. stain when the sample contained 500 p.p.m. NH₃ and a 22 mm. stain when the sample contained 250 p.p.m. NH₃.

*Example III.*—Fifteen hundred grams of 60–80 mesh Pyrex glass beads, 2 grams of clay, and .90 gram of lead acetate dissolved in 4.5 cc. of water are mixed and dried as in the previous examples. Indicator tubes containing this indicator exhibit a substantially linear response to varying amounts of hydrogen sulfide passed into the tube in hydrogen sulfide-air mixtures of various concentrations.

*Example IV.*—Fifteen hundred grams of 60–80 mesh Pyrex glass beads, 22.5 grams of pulverized silica gel, and a solution of 3 grams of potassium dichromate in 10 ml. of concentrated sulfuric acid were mixed and dried as in the previous examples. Although the involatile concentrated $H_2SO_4$ remaining after removal of the water is liquid, it is adsorbed by the binder thus yielding a dry and free flowing indicator of uniform yellow to orange color. Indicator tubes prepared from this indicator showed a substantially linear length of green stain development in response to varying amounts of alcohol contained in air-alcohol vapor gas samples.

*Example V.*—The procedure in preparing the indicators may be modified as required to prepare indicators containing chemicals that must be incorporated in the indicator in a specified order or under specific conditions. Thus, in preparing an indicator utilizing the active colorimetric chemical for determining $SO_2$ described in U.S. 2,736,638 the following procedure is followed. Glass beads, clay and iodine solution are mixed and dried to a free flowing dry state as in the pervious example. Tetramethyldiaminodiphenylmethane is added to the coated beads and thoroughly dispersed by agitation until the indicator has a uniform blue color. On passage of a gas sample containing $SO_2$ through a tube containing the indicator so prepared, a white stain develops that is substantially linearly related to the amount of $SO_2$ passed into the tube.

The indicators of this invention, with their attendant advantages, may be used for determination of gas other than gases mentioned in the examples. The colorimetric reagent used will depend, of course, upon the particular gas or vapor to be determined, and perhaps on other constituents of atmosphere. Many reagents undergoing color change are known for the individual gases and vapors, and in many instances a selection is possible. The indicator tubes containing indicators of this invention may be made and used in the same manner as prior indicator tubes utilizing absorbent carrier indicators. Thus, for example, indicator tubes may contain layers of guard chemicals on either end of the indicator to protect the indicator or remove interferant gases from the gas sample. Indicator tubes are formed with sealed breakable tips to provide for safe storage, the tips being broken off at the time of use.

According to the provisions of the patent statutes, we have explained the principle and mode of practice of our invention and have described what we now consider to represent its best embodiment. However, we desire to have it understood that within the scope of the appended claims, the invention may be practiced otherwise than as specifically described.

We claim:

1. A free-flowing colorimetric indicator consisting essentially of a finely divided non-porous inorganic carrier coated with a self-adherent film of a powdered inorganic absorbent impregnated with a colorimetric reagent.

2. An indicator according to claim 1 in which the particle size of the carrier is between about 40 and 100 mesh.

3. An indicator according to claim 1 in which the amount of absorbent is between about 10 and 50% of the amount of absorbent that will adhere to the carrier.

4. An indicator according to claim 1 in which the inorganic absorbent is clay.

5. An indicator according to claim 1 in which the inorganic absorbent is diatomaceuos earth.

6. An indicator according to claim 1 in which the carrier is glass beads.

7. An indicator according to claim 6 in which the carrier is glass beads of a size between about 60 and 80 mesh.

8. An indicator according to claim 7 in which there is between about 0.08 gram and 0.40 gram of absorbent for each 100 grams of glass beads.

9. A colorimetric indicator consisting essentially of a finely divided non-porous inorganic material coated with a self-adherent film of a powdered inorganic absorbent impregnated with the substantially dry residue of a solution of a colorimetric reagent.

10. An indicator tube comprising a sealed transparent tube with easily breakable ends containing therein an elongate bed of colorimetric indicator consisting of a finely divided non-porous inorganic carrier coated with a self-adherent film of a powdered inorganic absorbent impregnated with a colorimetric indicator.

11. An indicator tube according to claim 10 for ammonia wherein the colorimetric reagent is oxalic acid and thymol blue.

12. An indicator tube according to claim 10 for hydrochloric acid wherein the carrier is soft glass beads and the colorimetric reagent is Congo Red.

13. An indicator tube according to claim 10 for alcohols wherein the colorimetric reagent is sulfuric acid and potassium dichromate.

References Cited

UNITED STATES PATENTS

| | | | |
|---|---|---|---|
| 2,487,077 | 11/1949 | Shepherd | 23—232 |
| 2,736,638 | 2/1956 | McConnaughey | 23—232 |
| 2,939,768 | 6/1960 | Grosskopf | 23—232 |
| 2,942,952 | 6/1960 | Plantz et al. | 23—232 |
| 2,963,351 | 12/1960 | Stanford et al. | 23—232 |
| 3,068,073 | 11/1962 | Stanford | 23—232 |

OTHER REFERENCES

Curtman, Chemical Reagents and Spectroscope, pp. 77–78, 119–120.

MORRIS O. WOLK, *Primary Examiner.*

Z. PAROCZAY, R. M. REESE, *Assistant Examiners.*